(12) United States Patent
Okkel et al.

(10) Patent No.: US 11,787,955 B2
(45) Date of Patent: Oct. 17, 2023

(54) AQUEOUS DISPERSANT COMPOSITION

(71) Applicant: BYK-Chemie GmbH, Wesel (DE)

(72) Inventors: Andreas Okkel, Wesel (DE); Sabine Stelz, Oberhausen (DE); Sabrina Stopka, Duisburg (DE)

(73) Assignee: BYK-Chemie GmbH, Wesel (DE)

( * ) Notice: Subject to any disclaimer, the term of this patent is extended or adjusted under 35 U.S.C. 154(b) by 125 days.

(21) Appl. No.: 17/430,504

(22) PCT Filed: Feb. 18, 2020

(86) PCT No.: PCT/EP2020/054243
§ 371 (c)(1),
(2) Date: Aug. 12, 2021

(87) PCT Pub. No.: WO2020/169605
PCT Pub. Date: Aug. 27, 2020

(65) Prior Publication Data
US 2022/0135812 A1 May 5, 2022

(30) Foreign Application Priority Data
Feb. 22, 2019 (EP) ..................... 19158819

(51) Int. Cl.
*C09D 7/45* (2018.01)
*C09D 7/65* (2018.01)
*C09D 7/20* (2018.01)
*C09D 17/00* (2006.01)
*C09D 133/04* (2006.01)

(52) U.S. Cl.
CPC ................ *C09D 7/45* (2018.01); *C09D 7/20* (2018.01); *C09D 7/65* (2018.01); *C09D 17/001* (2013.01); *C09D 133/04* (2013.01)

(58) Field of Classification Search
CPC .......... C09D 7/45; C09D 7/65; C09D 133/04; C09D 17/001; C09D 7/20
USPC ....................................................... 524/501
See application file for complete search history.

(56) References Cited

U.S. PATENT DOCUMENTS 3,392,155 A * 7/1968 Muskat ................... C08F 22/04
525/327.7
4,985,506 A 1/1991 Blum et al.
8,097,076 B2 1/2012 Goebelt et al.
8,129,476 B2 3/2012 Goebelt et al.
8,153,731 B2 4/2012 Goebelt et al.
8,927,623 B2 1/2015 Goto
9,079,996 B2 7/2015 Goebelt et al.
10,106,696 B2 10/2018 Liu et al.
2013/0096244 A1 4/2013 Schwarz-Barac et al.
2015/0152211 A1 6/2015 Goebelt et al.
2015/0203619 A1 7/2015 Nagelsdiek et al.

FOREIGN PATENT DOCUMENTS

| DE | 102010049642 A1 | 1/2012 |
|---|---|---|
| EP | 2106412 B1 | 6/2010 |
| EP | 2125910 B1 | 3/2011 |
| EP | 2125909 B1 | 4/2011 |
| EP | 2240543 B1 | 8/2012 |
| EP | 2723779 B1 | 1/2015 |
| EP | 2864373 B1 | 12/2015 |
| EP | 2975092 A1 | 1/2016 |
| EP | 3004215 A1 | 4/2016 |
| FR | 3043684 A1 | 5/2017 |
| GB | 980112 A | 1/1965 |
| JP | 05118832 B2 | 1/2013 |
| WO | 2006138269 A2 | 12/2006 |
| WO | 2008080581 A1 | 7/2008 |
| WO | 2012004257 A2 | 1/2012 |
| WO | 2015035107 A1 | 3/2015 |

OTHER PUBLICATIONS

International Search Report and Written Opinion for International Application No. PCT/EP2020/054243, dated Jun. 9, 2021 (11 pages).
International Preliminary Report on Patentability International Application No. PCT/EP2020/054243, dated Jun. 9, 2021 (7 pages).

* cited by examiner

*Primary Examiner* — Hui H Chin
(74) *Attorney, Agent, or Firm* — Fitch, Even, Tabin & Flannery LLP

(57) ABSTRACT

The invention relates to an aqueous composition having a continuous aqueous phase, a polymer having a polymer backbone having carboxylic acid groups covalently linked to the polymer backbone, a polyalkylene oxide terminated at one end by a hydrocarbyl group having 8 to 30 carbon atoms, and, a compound according to formula (I) as described herein.

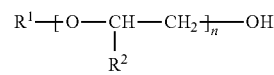

12 Claims, No Drawings

AQUEOUS DISPERSANT COMPOSITION

The invention relates to a composition comprising a polymer having a backbone having carboxylic acid groups covalently linked to the backbone, a polyalkylene oxide and a compound according to formula (I)

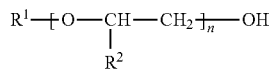

wherein $R^1$ is an aliphatic or aromatic hydrocarbon with 3 to 10 carbon atoms, $R^2$ is H or $CH_3$ and n is 1 or 2, the preparation and use of said composition as dispersing agent for solid particles. Additionally, the invention relates to a coating composition comprising said composition.

Wetting and dispersing additives are employed to improve the dispersibility of pigments as well as the stability of the pigment dispersion in liquid media. EP 2125909 A1 deals with such wetting and dispersing agents. It relates to comb (block) copolymers that can be obtained by reacting one (block) copolymer comprising polymerized styrene and maleic anhydride units with at least one polyalkylene oxide monoamine, followed by salinization of at least 25 mol % of the free carboxyl groups of the reaction product.

WO 2008/080581 A1 relates to the use of a polymer mixture as wetting and dispersing agents. The polymer mixture consists of at least one comb polymer containing blocks of special structural units and at least one copolymer comprising polymerized styrene and maleic anhydride units. The carboxyl groups are at least partly present as alkaline metals salts, earth alkaline metals salts or ammonium salts.

US 2010/0322879 A1 relates to a low-VOC mixture of at least partially salified copolymers of at least one ethylenically unsaturated, phenyl-group containing monomer and at least one α-β-unsaturated monocarboxylic acid and/or at least one α-β unsaturated dicarboxylic acid, of at least one water-soluble polyether, esterification products of at least one water-soluble polyether and an aliphatic dicarboxylic acid, and of a star polymer obtainable by esterifying a carboxylic acid containing at least 3 carboxyl groups with at least one water-soluble polyether. Furthermore, it relates to the use thereof as a wetting and dispersing agent, preferably for producing low-VOC pigment pastes or low-VOC paint systems.

Besides the stabilizing effects mentioned above, wetting and dispersing additives sometimes have a negative impact on stain resistance of waterborne wood coatings as well as water resistance of waterborne protective coatings. Due to a certain hydrophilicity, which can be achieved for example through ionic structures or hydrophilic domains, dispersing additives for water-borne coatings bear the risk to increase the overall hydrophilicity of the final coating and thus, certain coating characteristics such as water, stain and corrosion resistance can be negatively influenced.

It was an object of the present invention, therefore, to provide new wetting and dispersing additives. These new agents should provide good pigment stabilization. They should also alleviate the disadvantages stated in the above. More particularly the intention was to find a wetting and dispersing additive, which provides good pigment stabilization and leads to coatings having anticorrosive properties. A further aim of the present invention was to provide a wetting and dispersing additive providing unique performance in terms of water resistance of waterborne coatings.

Surprisingly it has been found that these objectives can be achieved with an aqueous composition having a continuous aqueous phase, wherein the composition comprises a) a polymer having a polymer backbone having carboxylic acid groups covalently linked to the polymer backbone, dissolved in the continuous aqueous phase, wherein 10 to 100 mol-% of the acid groups are neutralized by a base selected from ammonia, and amines having 1 to 12 carbon atoms, and mixtures thereof, b) a polyalkylene oxide terminated at one end by a hydrocarbyl group having 8 to 30 carbon atoms and c) a compound according to formula (I)

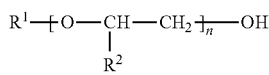

wherein $R^1$ is an aliphatic or aromatic hydrocarbon with 3 to 10 carbon atoms, $R^2$ is H or $CH_3$ and n is 1 or 2, wherein components a), b), and c) together have an acid value in the range of 20 to 200 mg KOH/g, and wherein the polymer has one or more pendant groups (A) connected to the polymer backbone by a covalent link, wherein the pendant group (A) comprises a polyalkylene oxide segment and a hydrocarbyl segment having 8 to 30 carbon atoms, and wherein the polyalkylene oxide segment is located between the hydrocarbyl segment and the covalent link.

Suitable monomers for the preparation of the polymer backbone are ethylenically unsaturated polymerizable monomers. Suitable examples of such monomers are esters of acrylic or methacrylic acid, such as methyl (meth)acrylate, ethyl (meth)acrylate, propyl(meth)acrylate, isobutyl (meth)acrylate, n-butyl (meth)acrylate, isopropyl(meth) acrylate, t-butyl(meth)acrylate, hexyl(meth)acrylate, cyclohexyl(meth)acrylate, and other esters of acrylic or methacrylic acid having 1 to 18 carbon atoms as well as esters of methacrylic acids of polyethylene glycol. Furthermore, suitable monomers are (meth)acrylates with ether groups such as 2-methoxyethyl (meth)acrylate, 2-ethoxyethyl (meth) acrylate, and 3-methoxypropyl (meth)acrylate; 2-hydroxybutyl (meth)acrylate, 3-hydroxybutyl (meth)acrylate, 3-hydroxypropyl (meth)acrylate, 4-hydroxybutyl (meth)acrylate, (meth)acrylic acid, 11-carboxyethyl acrylate, crotonic acid, maleic acid, fumaric acid, itaconic acid, citraconic acid; monoalkyl esters of unsaturated dicarboxylic acids, other methacrylates such as dimethyl aminoethyl methacrylate, glycidyl (metha)crylate, 2-acetoxyethyl methacrylate, 3-(trimethoxysilyl-)propyl methacrylate. Further suitable monomers are esters of ß-carboxyethyl acrylate and crotonic acid and (cyclo)alkyl esters of unsaturated dicarboxylic acids such as diethyl maleate and dibutyl fumarate, di(cyclo) alkyl itaconates and di(cyclo)alkyl citraconates.

Other suitable ethylenically unsaturated monomers include allylpolyethers and vinyl aromatic compounds such as styrene, alpha-methyl styrene, o-, m-, or p-methyl styrene, and tert.-butyl styrene; maleic anhydride, itaconic anhydride, citraconic anhydride, acrylamide, methacrylamide, acrylonitrile, N-alkoxy acrylamides, N-alkoxy methacrylamides; vinyl esters such as vinyl acetate, vinyl propionate, vinyl isobutyrate, vinyl esters of alpha-branched monocarboxylic acids. Other suitable vinyl monomers include vinyl chloride, vinylidene chloride, vinyl pyrrolidone.

The polymer backbone may also contain minor amounts up to 10% of polymerized units of polyunsaturated monomers such as allyl methacrylate, ethylene glycol dimethacrylate, hexanediol diacrylate, or trimethylol propane triacrylate.

Carboxylic acid groups covalently linked to the polymer backbone are suitably introduced by copolymerizing carboxylic acid and/or carboxylic anhydride functional ethylenically unsaturated monomers. Examples of such monomers are maleic acid, maleic anhydrid, acrylic acid, methacrylic acid, fumaric acid, crotonic acid, and itaconic acid.

The composition of the present invention comprises a continuous aqueous phase. The polymer is dissolved in the continuous aqueous phase. The continuous aqueous phase can consist of up to 40 weight-% of water-soluble organic solvents. Examples of suitable organic solvents are ethers and esters of diols, such as propylene glycol monomethyl ether, 2,2,4-trimethyl-1,3-pentandiolmonoisobutyrat, and 1-methoxy-2-propylacetat. Preferably, the major part of the continuous aqueous phase is water.

The components a), b), and c) of the composition together have an acid value in the range of 20 to 200 mg KOH/g, preferably 50 to 130 mg KOH/g, and most preferably 65 to 110 mg KOH/g. 10 to 100 mol-%, preferably 30 to 90 mol-%, of the carboxylic acid groups covalently linked to the polymer backbone are neutralized by a base selected from ammonia, and amines having 1 to 12 carbon atoms, and mixtures thereof.

After neutralization, components a), b), and c) together preferably have an amine value in the range of 20 to 220 mg KOH/g, more preferably in the range of 50 to 130 mg KOH/g, most preferably in the range of 65 to 110 mg KOH/g.

Preferably, the amines have 1 to 8 carbon atoms, more preferably 1 to 5 carbon atoms and most preferably 1 to 4 carbon atoms.

Examples of amines suitable for use in the present invention are methylamine, dimethylamine, ethylamine, diethylamine, triethylamine, propylamine, 2-propylamine, and dimethyl ethanolamine.

The composition of the invention comprises a polyalkylene oxide b) which is terminated at one end by a hydrocarbyl group having 8 to 30 carbon atoms. In another embodiment, the polyalkylene oxide is terminated at the other end by a hydroxyl group. The polyalkylene oxid can be branched or linear, preferably it is linear. Generally, the polyalkylene oxid has at least one hydroxyl group. Alternatively, the polyalkylene oxid may have one primary or secondary amine group.

The alkylene oxide group is preferably ethylene oxide or a mixture of propylene oxide and ethylene oxide, whereas the mixture contains up to 40 mol-% of propylene oxide. It may comprise 3 to 25, preferably 6 to 15, ethylene oxide units.

The composition of the invention comprises a polyalkylene oxide which is terminated at one end by a hydrocarbyl group having 8 to 30 carbon atoms. Preferably, the hydrocarbyl group has 8 to 20 carbon atoms, more preferably 10 to 20 carbon atoms and most preferably 12 to 18 carbon atoms.

Suitably, the hydrocarbyl group having 8 to 30 carbon atoms is an aliphatic or aromatic hydrocarbyl group.

Suitable examples of the hydrocarbyl group are linear or branched aliphatic groups. The hydrocarbyl group may suitably be linear or branched and have 12 to 18 carbon atoms.

According to the present invention the composition comprises a compound c) according to formula (I)

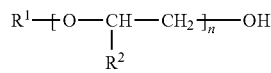

wherein $R^1$ is an aliphatic or aromatic hydrocarbon with 3 to 10 carbon atoms, $R^2$ is H or $CH_3$ and n is 1 or 2.

$R^1$ may be aromatic or aliphatic, wherein the term "aliphatic" encompasses non-aromatic, acyclic and cyclic, saturated and unsaturated, linear and branched carbon containing groups. However, organic groups can also contain aliphatic and aromatic moieties at the same time. E.g. an aliphatic group which contains one or more aromatic groups as substituents is called araliphatic group. Of course, aromatic groups may comprise aliphatic substituents.

Suitable examples of component c) are 2-phenoxyethanol, and 2-butoxyethanol, 2-(2-phenoxyethoxy)ethanol. Preferably, component c) is 2-phenoxyethanol.

Suitably, the pendant group (A) connected to the polymer backbone by a covalent link comprises a polyalkylene oxide segment and a hydrocarbyl segment as described above in regard to component b).

The covalent link preferably contains an ester group.

Preferably, the polymer of the aqueous composition has one or more pendant groups (B) connected to the polymer backbone by a covalent link, wherein the pendant group comprises one aromatic or aliphatic group and 1 or 2 non-cyclic ether groups, and wherein the non-cyclic ether groups are located between the aromatic or aliphatic group and the covalent link. The covalent link preferably contains an ester group.

The pendant group (B) connected to the polymer backbone may comprise one aromatic or aliphatic group, wherein the term "aliphatic" encompasses non-aromatic, acyclic and cyclic, saturated and unsaturated, linear and branched carbon containing groups. However, the group can also contain aliphatic and aromatic moieties at the same time. E.g., an aliphatic group, which contains one or more aromatic groups as substituents is called araliphatic group. Aromatic groups may comprise aliphatic substituents. It is preferred that the pendant group comprises one aromatic or aliphatic group and 1 to 2 non-cyclic ether groups. Generally, the pendent group comprises at most 2 ether groups.

The polymer of the composition may comprise repeating units of polymerized ethylenically unsaturated monomers. Suitable examples of ethylenically unsaturated monomers are described above.

Preferably, the ethylenically unsaturated monomers of the composition comprise vinyl aromatic monomers and carboxylic acid- and/or carboxylic anhydride-functional monomers.

Examples of suitable vinyl aromatic compounds include styrene, vinyl toluene, vinyl xylene, vinyl ethylbenzene, and mixtures thereof. Further examples are polymerized units of an ethylenically unsaturated polymerizable carboxylic anhydride, or of an ethylenically unsaturated polymerizable dicarboxylic acid. Examples of suitable monomers include maleic anhydride, itaconic anhydride, citraconic anhydride, fumaric acid, esters of the aforementioned compounds, and mixtures thereof. The polymer can suitable be prepared by copolymerization of the above described two types of monomers. If so desired, other monomers may be included in the polymer, for example esters of acrylic or methacrylic acid. In a preferred embodiment, the polymer is a copolymer of styrene and maleic anhydride and/or a copolymer of alpha-methylstyrene and maleic anhydride, or a copolymer of alpha-methylstyrene, styrene, and maleic anhydride.

In some embodiments, the base of the composition is selected from ammonia and amines having a boiling point of at most 100° C. at a pressure of 1000 mbar. It is preferred that the ammonia and amines have a boiling point of at most 60° C. and even more preferred that the ammonia and amines have a boiling point of at most 40° C. Suitably, the ammonia and amines of the present invention may have a boiling point of at least −40° C. at a pressure of 1000 mbar, more suitably of at −30° C. and most suitably of at least −20° C.

The water content of the composition of the invention generally is in the range of 25 to 85% by weight, preferably 35 to 75% by weight, calculated on the total weight of the composition.

The composition of the present invention may be used as a dispersing agent for solid particles. Such dispersed solid particles may be employed in waterborne coatings, such as wood or protective coatings as well as for example in inkjet inks, printing inks and architectural coatings.

The invention also relates to a process for dispersing solid particles comprising the steps of providing the composition of the invention as dispersing agent, providing solid particles, mixing the components and applying shear force to form a dispersion of solid particles.

In a preferred embodiment, the solid particles comprise at least one of pigments and fillers.

Suitable examples for the pigments and fillers may be inorganic or organic pigments and mixtures thereof. The organic pigments typically are color pigments. This refers to colored material made of organic compounds with pigment properties.

Preferred organic pigments are azo-pigments, phthalocyanine-pigments, quinacridone-pigments, benzimidazolone-pigments, isoindolinone-pigments, dioxazine-pigments, indanthrene-pigments, and perylene-pigments. Examples of usable pigments will be shown below by a pigment number. "C.I." listed below means color index.

Examples of red pigments include C.I. Pigment Red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, and 276. Among the above, C.I. Pigment Red 48:1, 122, 168, 177, 202, 206, 207, 209, 224, 242 or 254 is preferable, and C.I. Pigment Red 177, 209, 224, or 254 is further preferable.

Examples of blue pigments include C.I. Pigment Blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, and 79. Among them, C.I. Pigment Blue 15, 15:1, 15:2, 15:3, 15:4 or 15:6 is preferable, and C.I. Pigment Blue 15:3, 15:4 or 15:6 are further preferable.

Examples of the green pigment include C.I. Pigment Green 1, 2, 4, 7, 8, 10, 13, 14, 15, 17, 18, 19, 26, 36, 45, 48, 50, 51, 54, 55, 58, 59, 60, 61, or 62. Among them, C.I. Pigment Green 7, 36, 58, 59, 62 and 63 is preferable.

Examples of the yellow pigment include C.I. Pigment Yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 117, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, 208 or 213. Among them, C.I. Pigment Yellow 83, 117, 129, 138, 139, 150, 154, 155, 180, or 185 is preferable, and C.I. Pigment Yellow 83, 138, 139, 150, 180, 185 or 213 is further preferable.

Examples of a violet pigment include C.I. Pigment Violet 1, 1:1, 2, 2:2, 3, 3:1, 3:3, 5, 5:1, 14, 15, 16, 19, 23, 25, 27, 29, 31, 32, 37, 39, 42, 44, 47, 49, and 50. Among them, C. I. Pigment Violet 19, or 23 is preferable, and C. I. Pigment Violet 23 is further preferable.

Examples of an orange pigment include C.I. Pigment Orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, and 79. Among them, C.I. Pigment Orange 36, 38 and 71 are preferable.

Besides so-called "single grinds" of dispersions of one type of pigment, another example for the highly beneficial use of the inventive composition as wetting agent and/or dispersant is the dispersing and stabilization of mixtures of organic pigments, so-called "co-grinds". Mixtures of organic pigments are produced to obtain colored coatings, with unique coloristic properties matching best the color space that the human eye can interpret. Mixtures of organic pigments and their co-grinds in the sense of this invention can comprise, for instance: C.I. Pigment Blue 15:6 and C.I. Pigment Violett 23; C.I. Pigment Blue 15:4 and C.I. Pigment Violett 23; C.I. Pigment Blue 15:3 and C.I. Pigment Violett 23; C.I. Pigment Green 58 and C.I. Pigment Yellow 138; C.I. Pigment Green 59 and C.I. Pigment Yellow 138; C.I. Pigment Green 36 and C.I. Pigment Yellow 138; C.I. Pigment Green 7 and C.I. Pigment Yellow 138 among others.

It is preferable that the pigment(s) have an average median particle diameter of 1 µm or less, preferably 0.3 µm or less, further preferably 50 nm or less determined by laser diffraction according ISO 13320:2009.

A black pigment may be used alone, or may be used by mixing with the red, green or blue pigment(s). Examples of the black pigment which can be used alone include carbon black, acetylene black, lamp black, bone black, graphite, iron black, titanium black, perylene black and other organic pigment.

Examples of carbon black include MA7, MA8, MA11, MA100, MA100R, MA220, MA230, MA600, #5, #10, #20, #25, #30, #32, #33, #40, #44, #45, #47, #50, #52, #55, #650, #750, #850, #950, #960, #970, #980, #990, #1000, #2200, #2300, #2350, #2400, #2600, #3050, #3150, #3250, #3600, #3750, #3950, #4000, #4010, OIL7B, OIL9B, OIL11B, OIL30B, OIL31B as manufactured by Mitsubishi Chemical Corporation; Printex3, Printex30P, Printex30, Printex300P, Printex40, Printex45, Printex55, Printex60, Printex75, Printex80, Printex85, Printex90, Printex A, Printex ex L, Printex G, Printex P, Printex U, Printex V, Printex G, Special Black 550, Special Black 350, Special Black 250, Special Black 100, Special Black 6, Special Black 5, Special Black 4, Color Black FW1, Color Black FW2, Color Black FW2V, Color Black FW18, Color Black FW18, Color Black FW200, Color Black S160, Color Black S170 as manufactured by Degussa; Monarch 120, Monarch 280, Monarch 460, Monarch 800, Monarch 880, Monarch 900, Monarch 1000, Monarch 1100, Monarch 1300, Monarch 1400, Monarch 4630, REGAL99, REGAL99R, REGAL415, REGAL415R, REGAL250, REGAL250R, REGAL330, REGAL400R, REGAL55R0, REGAL660R, BLACK PEARLS480, PEARLS130, VULCAN XC72R, ELFTEX-8 as manufactured by Cabot; RAVEN11, RAVEN14, RAVEN15, RAVEN16, RAVEN22, RAVEN30, RAVEN35, RAVEN40, RAVEN410, RAVEN420, RAVEN450, RAVEN500, RAVEN780, RAVEN850, RAVEN890H, RAVEN1000, RAVEN1020, RAVEN1040, RAVEN1060U, RAVEN1080U, RAVEN1170, RAVEN1190U, RAVEN1250, RAVEN1500, RAVEN2000, RAVEN2500U, RAVEN3500, RAVEN5000, RAVEN5250, RAVEN5750, RAVEN7000 as manufactured by Columbia Carbon.

Examples of perylene black include C.I. Black pigment 31 and 32. Example of other organic black pigment is Black S 0100 CF as manufactured by BASF.

Inorganic pigments can be of natural or synthetically origin. Examples for inorganic pigments are ultramarine violet, han purple, cobalt violet, manganese violet, purple of cassius, ultramarine blue, persian blue, cobalt blue, cerulean blue, egyptian blue, han blue, azurite, prussian blue, YInMn blue, manganese blue, cadmium green, chrome green, viridian, cobalt green, malachite, Scheele's green, green earth, orpiment, primrose yellow, cadmium yellow, chrome yellow, aureoline, yellow ochre, naples yellow, lead-tin-yellow, mosaic gold, zinc yellow, cadmium orange, chrome orange, realgar, cadmium red, sanguine, caput mortuum, indian red, venetian red, red ochre, burnt sienna, minium, vermilion, raw umber, raw sienna, carbon black, ivory black, vine black, lamp black, manganese dioxide, titanium black, antimony white, barium sulfate, lithopone, cremnitz white, titanium white, zinc white. Further examples for pigments are anticorrosives pigments (e.g. zinc phosphates, calcium phosphates, modified orthophosphates, and polyphosphates).

Suitable examples of fillers are clays, calcium carbonate, (natural) micas, silicas, talc, engineered molecules, calcined clays, blanc fixe, precipitated calcium carbonate, synthetic pyrogenic silica, transparent silicon dioxide, ground quartz, aluminium oxide, aluminium hydroxide, natural and precipitated chalk, barium sulfate, diatomaceous earth, lime and barytes.

Furthermore, the present invention relates to an aqueous coating composition comprising i) water, ii) a film-forming binder and iii) the composition of the present invention.

The amount of water in the aqueous coating composition may preferably be 10 to 80% by weight, more preferably 15 to 60% by weight and most preferably 25 to 40% by weight, calculated on the total weight of the aqueous coating composition.

The amount of the film-forming binders may preferably be 5 to 70% by weight, more preferably 10 to 50% by weight and most preferably 15 to 35% by weight, calculated on the total weight of the aqueous coating composition.

Suitable examples for film-forming binders may comprise synthetic or natural resins such as alkyds; acrylics, such as self-crosslinking multiphase acrylic dispersions, thermosetting acrylics, styrene-acrylate dispersions, water-reducible hydroxyfunctional polyacrylic dispersions in combination with aliphatic polyisocyanates; vinyl acrylics; vinyl acetate/ethylene copolymers; polyurethanes, polyesters; melamine resin; epoxy resins, optionally in combination with amine curing agents; silanes; siloxanes; natural oils; polyurethanes (1-component and 2-component systems); polyaspartics; PVC plastisols, PVC organosols; thermoplastics; unsaturated polyester resins; and combinations thereof.

The composition of the present invention iii) is preferably added to the coating composition in such an amount that the sum of components a), b) and c) is present in the coating composition in the range of 0.1 to 5.0% by weight, more preferably 0.2 to 2.0% by weight and most preferably 0.3 to 0.6% by weight, calculated on the total weight of the aqueous coating composition.

The content of the film-forming binder ii) may suitably be 5 to 70% by weight, more preferably 10 to 50% by weight and most preferably 15 to 35% by weight, calculated on the total weight of the aqueous coating composition.

In preferred embodiments, the aqueous coating composition comprises solid particles. Examples of suitable solid particles are the various types of pigments and fillers described above.

Suitably, the aqueous coating composition comprises 10.0 to 80.0 weight-% of water, 5.0 to 70.0 weight-% of film-forming binder, the composition of the invention in such an amount that the sum of components a), b) and c) is present in the coating composition in the range of 0.1 to 5.0 weight-%, and 1.0 to 60.0 weight-% of one or more type of solid particles, such as pigments and/or fillers. The weight-% are calculated on the total weight of the aqueous coating composition.

In some embodiments, the aqueous coating compostions comprises water miscible organic solvents. Examples of suitable organic solvents are ethers and esters of diols, such as propylene glycol monomethyl ether, 2,2,4-trimethyl-1,3-pentandiolmonoisobutyrat, and 1-methoxy-2-propylacetat. Preferably, the organic solvents are present in an amount of 0.0 to 7.0% by weight, calculated on the total weight of the aqueous coating composition.

Preferably, pigments and fillers are present in an amount of 5 to 60% by weight, more preferably 10 to 50% by weight and most preferably 15 to 40% by weight, calculated on the total weight of the aqueous coating composition.

In typical embodiments, the composition of the present invention iii) is added to the coating composition in such an amount that the sum of components a), b) and c) is present in an amount of 2 to 15% by weight, calculated on the weight of inorganic pigments, 1 to 3% by weight, calculated on the weight of fillers, and 5 to 80% by weight, calculated on the weight of organic pigments.

Furthermore, the invention relates to a process for preparing the composition of the invention comprising the steps of i) providing a copolymer having cyclic carboxylic anhydride groups,
ii) reacting the cyclic carboxylic anhydride groups with components b) and c) in the absence of water and generating carboxylic acid groups,
iii) neutralizing 10 to 100 mol-% of the carboxylic acid groups by adding a base selected from ammonia, and amines having 1 to 12 carbon atoms, and mixtures thereof and
iv) diluting with water.

EXAMPLES

Methods of Analysis:
Acid and amine values may be calculated based on raw materials used or determined by titration.

Measurement of Acid Values
The acid value is the KOH quantity in mg that is required for neutralizing 1 g of substance. The acid values were determined by a neutralization reaction with a 0.1 N KOH in Ethanol according to DIN EN ISO 2114.

Measurement of Amine Values

The amine number is the amount KOH in mg which corresponds to the amine content of 1 g of substance. The amine values were determined according to DIN 16945 by potentiometric titration with 0.1 N perchloric acid in acetic acid.

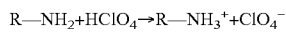

| Used (raw) materials: | |
|---|---|
| DISPERBYK 190 | P1* (comparative example); BYK-Chemie GmbH, Acidic W&D additive with polyether side chains and without neutralization (acid value 10 mg KOH/g, 40% active substance) |
| Lutensol AO 11 | $C_{13}$-$C_{15}$ Oxo alcohol ethoxylate with 11 ethylene oxide units, purchased from BASF SE |
| SMA 2000 | Styrene maleic anhydride copolymer, ratio of styrene/maleic anhydride 2/1, acid value 355 mg KOH/g, purchased from Cray Valley |
| SMA 3000 | Styrene maleic anhydride copolymer, ratio of styrene/maleic anhydride 3/1, acid value 285 mg KOH/g, purchased from Cray Valley |

Synthesis of Wetting and Dispersing Additives:

P2* (Comparative Example)

Preparation according to US 2010/0322879 A1, Examples Polymer 1, page 5, paragraph [0086] to [0090]. 50 g of the polymer solution 4 were mixed and homogenized with 50 g of ester 1. Acid value: <1.0 mg KOH/g, amine value: 72.8 mg KOH/g).

P3

Into a four-necked flask equipped with stirrer, thermometer, reflux condenser and nitrogen inlet tube 95.0 g of methoxypropyl acetate (PMA) were introduced. The solvent was heated up to 50° C. 95.0 g of SMA 2000 were added in portions. After the addition of one portion, the mixture was stirred until the solution got clear again, then the next portion was added. After complete addition, 0.16 g of potassium carbonate were added and the mixture was heated up to 145° C. When the temperature had reached 80° C. a mixture of 64.2 g Lutensol AO 11 and 29.9 g 2-(2-phenoxyethoxy)ethanol was metered in within 60 minutes. After complete addition, the reaction mixture was stirred at 145° C. for 3 hours. The solvent was distilled off under reduced pressure and the mixture was cooled down to 97° C. At this temperature, a diluted solution of ammonia (437.6 g water and 21.0 g ammonia (25%)) was metered in at a rate that the temperature did not fall below 80° C. After complete addition, the reaction mixture was stirred at 80° C. for 1 hour. (Acid value: 27.1 mg KOH/g, amine value: 26.2 mg KOH/g). Calculated on the sum of a), b) and c), the following acid- and amine values were determined: Acid value: 90.3 mg KOH/g, amine value: 87.3 mg KOH/g.

P4

Into a four-necked flask equipped with stirrer, thermometer, reflux condenser and nitrogen inlet tube 60 g of methoxypropyl acetate (PMA) were introduced. The solvent was heated up to 50° C. 60 g of SMA 3000 were added in portions. After the addition of one portion, the mixture was stirred until the solution got clear again, then the next portion was added. After complete addition, 0.15 g of potassium carbonate were added and the mixture was heated to 145° C. When the temperature had reached 80° C., a mixture of 29.5 g Lutensol AO 11 and 17.7 g 2-butoxyethanol was metered in within 60 minutes. After complete addition, the reaction mixture was stirred at 145° C. for 1 hour. The solvent was distilled off under reduced pressure and the mixture was cooled down to 97° C. At this temperature a slow addition of 183.8 g water was started and at 86° C. a slow addition of 15.4 g triethylamine was started additionally. The temperature was slowly reduced to 80° C. and the reaction mixture was stirred at this temperature for 3 hours. (Acid value: 44.0 mg KOH/g, amine value: 28.9 mg KOH/g). Calculated on the sum of a), b) and c), the following acid- and amine values were determined: Acid value: 110.0 mg KOH/g, amine value: 72.3 mg KOH/g.

P5

Into a four-necked flask equipped with stirrer, thermometer, reflux condenser and nitrogen inlet tube 60 g of methoxypropyl acetate (PMA) were introduced. The solvent was heated up to 50° C. 60 g of SMA 3000 was added in portions. After the addition of one portion, the mixture was stirred until the solution got clear again, then the next portion was added. After complete addition, 0.13 g of potassium carbonate were added and the mixture was heated to 145° C. When the temperature had reached 80° C., a mixture of 29.5 g Lutensol AO 11 and 13.7 g 2-phenoxyethanol was metered in within 60 minutes. After complete addition, the reaction mixture was stirred at 145° C. for 1 hour. The solvent was distilled off under reduced pressure. The mixture was cooled down to 97° C. A diluted solution of ammonia (150.8 g water and 10.3 g Ammonia (25%)) was metered in at a rate that the temperature did not fall below 80° C. After complete addition, the reaction mixture was stirred at 80° C. for 1 hour. (Acid value: 36.8 mg KOH/g, amine value: 29.0 mg KOH/g). Calculated on the sum of a), b) and c), the following acid- and amine values were determined: 92.0 mg KOH/g, amine value: 72.5 mg KOH/g.

P6

Into a four-necked flask equipped with stirrer, thermometer, reflux condenser and nitrogen inlet tube 47.5 g of methoxypropyl acetate (PMA) were introduced. The solvent was heated up to 50° C. 47.5 g of SMA 2000 was added in portions. After the addition of one portion, the mixture was stirred until the solution got clear again, then the next portion was added. After complete addition, 0.16 g of potassium carbonate were added and the mixture was heated to 145° C. When the temperature had reached 80° C., a mixture of 29.8 g Lutensol AO 11 and 18.3 g 2-(2-phenoxyethoxy)ethanol was metered in within 60 minutes. After complete addition, the reaction mixture was stirred at 145° C. for 3 hours. The solvent was distilled off under reduced pressure and the mixture was cooled down to 100° C. A diluted solution of ammonia (221.5 g water and 9.8 g Ammonia (25%)) was metered in at a rate that the temperature did not fall below 80° C. After complete addition, the reaction mixture was stirred at 80° C. for 1 hour. (Acid value: 27.4 mg KOH/g, amine value: 22.8 mg KOH/g). Calculated on the sum of a), b) and c), the following acid and amine values were determined: Acid value: 91.3 mg KOH/g, amine value: 76.0 mg KOH/g. -

APPLICATION TESTING

| | Used raw materials |
|---|---|
| Demineralized water | |
| BYK-024 | BYK-Chemie GmbH, VOC-free silicone-containing defoamer for aqueous emulsion lacquers, printing inks, overprint varnishes, and emulsion adhesives |
| Acticide MBS | Thor Specialities Ltd., Mixture of 1,2-benzisothiazolin-3-one (2.5%) and 2-methyl-4-isothiazolin-3-one (2.5%). Industrial microbiocide, algicide & fungicide |
| BYK-420 | BYK-Chemie GmbH, Liquid rheology additive for aqueous and water-reducible coating systems |
| Bayferrox 130M | micronized iron oxide red |
| Heliogen Blue L6900 | BASF, Alpha-modified phthalocyanine blue organic pigment |
| AMP 90 | Angus Chemical Company, 2-amino-2-methyl-1-propanol containing 10% water |
| Kronos 2190 | Kronos International, Inc., Titanium dioxide, rutile type produced by the sulphate process |
| Calcilit Super G | Alpha Calcit Fullstoff Gesellschaft mbH & Co. KG, calcium carbonate |
| Alberdingk AC 2403 | Alberdingk Boley GmbH, self-crosslinking and adhesion promoted two phase acrylic dispersion |
| BYK-349 | BYK-Chemie GmbH, Silicone surfactant for aqueous coatings, adhesives and maintenance products |
| Texanol | Eastman Chemical Company, Co-Solvent, 2,2,4-Trimethyl-1,3-pentanediol Monoisobutyrate |
| Nalzin FA 179 | Elementis Specialties, Inc., corrosion inhibitor for aqueous paint systems to counteract the formation of flash-rust |
| OPTIFLO-T 1000 | BYK-Chemie GmbH, VOC-free associative thickener (HEUR) for aqueous systems to generate a Newtonian flow behavior |

1. Pigment Stabilization 1.1. Production of Pigment Concentrates and White Base

According to the formulation below, pigment concentrates with Bayferrox 130 M and Heliogen Blue L6900 were prepared. For Bayferrox 130 M, the amount of dispersing agent, based on non-volatile content thereof, was 10% by weight, calculated on the weight of the pigment. For Heliogen Blue L 6900, the amount of dispersing agent, based on non-volatile content thereof, was 40% by weight, calculated on the weight of the pigment.

Grinding Conditions:
Grinding time: 30 min (Bayferrox 130 M)/40 min (Heliogen Blue L6900)
Speed: 8000 rpm (Bayferrox 130 M)/10000 rpm (Heliogen Blue L6900)
Grinding media: Glass beads (1.0-1.3 mm 0), removed after dispersion by filter (Glass beads: pigment concentrate 1:1 by weight)
Temperature: 20° C.

White base was produced according to the following formulation:

| Pos. | Raw material | weight [g] |
|---|---|---|
| 1 | Demin. Water | 56.8 |
| 2 | DISPERBYK-190 | 10.4 |
| 3 | AMP 90 | 0.8 |
| 4 | BYK-024 | 0.8 |
| 5 | Kronos 2190 | 141.6 |
| 6 | Calcilit Super G | 60.0 |
| 7 | Alberdingk AC 2403 | 463.2 |
| 8 | Demin. Water | 36.0 |
| 9 | BYK-349 | 0.8 |
| 10 | AMP 90 | 1.6 |
| 11 | Texanol | 17.6 |
| 12 | Nalzin FA 179 | 4.0 |
| 13 | OPTIFLO-T 1000 | 4.0 |
| 14 | BYK-024 | 2.4 |
| | | 800.0 |

Therefore, component 5 and 6 were placed together in an 80 ml PE-cup and component 7 in a 175 ml PE-cup and put aside. In another 80 ml PE-cup, component 1-4 were added in the same order as in the table above and homogenized by using a Dispermat CV (Getzmann GmbH) with a Teflon disk, ø 2.0 cm, for 2 minutes at 4 m/s.

Then, component 5 and 6 were added to that preparation under stirring and dispersed for 10 minutes at 10 m/s. After finishing this preparation, so called slurry, it was put aside and the 175 ml PE cup, with component 7 in it, was placed under the Dispermat CV. The slurry was then added to component 7 under stirring at 4 m/s.

In a final step, component 8-14 were added under stirring one after the other and then dispersed for 3 minutes at 4 m/s.

| Pigment concentrate | Bayferrox 130 M (Color Index PR 101) weight [g] | | | | | | Heliogen Blue L 6900 weight [g] | | | | | |
|---|---|---|---|---|---|---|---|---|---|---|---|---|
| Water | 70.2 | 55.2 | 70.2 | 70.2 | 55.2 | 93.9 | 28.9 | 17.2 | 28.9 | 28.9 | 17.2 | 47.2 |
| P1* | 45.0 | — | — | — | — | — | 35.0 | — | — | — | — | — |
| P3 | — | 60.0 | — | — | — | — | — | 46.7 | — | — | — | — |
| P4 | — | — | 45.0 | — | — | — | — | — | 35.0 | — | — | — |
| P5 | — | — | — | 45.0 | — | — | — | — | — | 35.0 | — | — |
| P6 | — | — | — | — | 60.0 | — | — | — | — | — | 46.7 | — |
| P2* | — | — | — | — | — | 21.3 | — | — | — | — | — | 16.7 |
| BYK-024 | 3.0 | 3.0 | 3.0 | 3.0 | 3.0 | 3.0 | 1.0 | 1.0 | 1.0 | 1.0 | 1.0 | 1.0 |
| Acticide MBS | 0.3 | 0.3 | 0.3 | 0.3 | 0.3 | 0.3 | 0.1 | 0.1 | 0.1 | 0.1 | 0.1 | 0.1 |
| BYK-420 | 1.5 | 1.5 | 1.5 | 1.5 | 1.5 | 1.5 | — | — | — | — | — | — |
| Pigment | 180.0 | 180.0 | 180.0 | 180.0 | 180.0 | 180.0 | 35.0 | 35.0 | 35.0 | 35.0 | 35.0 | 35.0 |
| | 300.0 | 300.0 | 300.0 | 300.0 | 300.0 | 300.0 | 100.0 | 100.0 | 100.0 | 100.0 | 100.0 | 100.0 |

All components from the table above were added in the same order as in the formulation into a temperature controlled grinding vessel. After addition of each component, the mixture was homogenized with a spatula. The dispersion was done with a vertical beadmill using a teflon disk, 4.5 cm 0 (Dispermat CV, Getzmann GmbH) with the following parameters:

White base and pigment concentrates were stored for 24 hours at room temperature before continuing.

1.2. Testing of Pigment Stabilization Via White Reduction and Rub-Up Test

First, the white bases were blended with the pigment concentrates to form white reductions of the pigment concentrates. The blending rations are indicated in the table below.

| White Reduction | Bayferrox 130M | Heliogen Blue L 6900 |
|---|---|---|
| White Base [g] | 36.0 | 36.5 |
| Pigment concentrate [g] | 4.0 | 3.5 |
| | 40.0 | 40.0 |

Therefore, the white base was put into a Speedmixer cup (Hauschild Engineering) and the pigment concentrate was added on top. Then the samples were mixed for 1 minute at 2500 rpm with the Speedmixer (DAC 150.1 FVZ, Hauschild Engineering). Afterwards a draw down with a 200 μm wire bar coater was applied on contrast card (byko-chart 2851, BYK-Gardner GmbH). After application, the rub-up test was carried out by rubbing the finger on about ⅓ of the applied area. This was done when the paint got sticky or when there was a certain resistance to the rubbing. Rubbing was continued until the color difference between rubbed and non-rubbed area had reached the highest value and until this color difference remained constant.

After 24 hours, color difference was measured by measuring the ΔE-values between rubbed and non-rubbed areas with BYK spectro-guide sphere gloss (sample averaging: n=3, observer: D65/10°, geometry: d/8 spin, color system: CIELab; BYK-Gardner GmbH).

1.3. Results

| White Reduction | Bayferrox 130 M | | | | | |
|---|---|---|---|---|---|---|
| | P1* | P2* | P3 | P4 | P5 | P6 |
| Color (L*a*b*) | 54.8 | 55.0 | 54.9 | 55.1 | 54.8 | 55.0 |
| | 23.5 | 23.1 | 23.5 | 23.2 | 23.7 | 23.4 |
| | 9.1 | 8.1 | 8.8 | 8.4 | 9.1 | 8.5 |
| Rub-Up (ΔL*Δa*Δb*) | 0.2 | −0.1 | 0.0 | −0.1 | 0.0 | 0.0 |
| | 0.2 | 0.4 | 0.1 | 0.2 | 0.0 | 0.1 |
| | 0.2 | 0.6 | 0.2 | 0.3 | 0.1 | 0.2 |
| ΔE* | 0.4 | 0.7 | 0.2 | 0.3 | 0.1 | 0.2 |

| White Reduction | Heliogen Blue L 6900 | | | | | |
|---|---|---|---|---|---|---|
| | P1* | P2* | P3 | P4 | P5 | P6 |
| Color (L*a*b*) | 52.4 | 54.1 | 53.7 | 54.8 | 53.1 | 55.6 |
| | −15.6 | −15.8 | −15.9 | −16.1 | −15.8 | −16.6 |
| | −35.4 | −33.6 | −35.2 | −33.7 | −35.2 | −33.3 |
| Rub-Up (ΔL*Δa*Δb*) | 1.1 | 1.0 | 0.5 | 0.4 | 0.4 | 0.5 |
| | 0.3 | 0.1 | 0.1 | 0.1 | 0.1 | 0.2 |
| | 0.2 | 0.0 | 0.0 | −0.1 | 0.1 | 0.1 |
| ΔE* | 1.2 | 1.0 | 0.5 | 0.5 | 0.5 | 0.5 |

White reduction in combination with rub-up is an established method to evaluate the quality of a pigment dispersion. Lower ΔE-values between rubbed and non-rubbed area indicate a better stabilization of the pigments.

With P3, P4, P5 and P6 an improved pigment stabilization in form of lower ΔE-values between rubbed and non-rubbed area for both tested pigments could be achieved in comparison to P1*, and P2*.

2. Anti-Corrosive Performance 2.1. Production of Samples According to Formulation According to the table below, samples were prepared. The amount of dispersing agent, based on non-volatile content thereof, was 1.5% by weight, calculated on the combined weight of pigment and filler (components 5 and 6 in the table below).

| | W&D additive | Control | P1* | P2* | P3 | P5 | P6 |
|---|---|---|---|---|---|---|---|
| | active substance [% in water] | — | 40 | 84 | 30 | 40 | 30 |
| 1 | Demineralized water | 7.1 | 7.1 | 7.1 | 7.1 | 7.1 | 7.1 |
| 2 | Wetting and dispersing additive | — | 1.0 | 0.5 | 1.3 | 1.0 | 1.3 |
| 3 | AMP 90 | 0.1 | 0.1 | 0.1 | 0.1 | 0.1 | 0.1 |
| 4 | BYK-024 | 0.1 | 0.1 | 0.1 | 0.1 | 0.1 | 0.1 |
| 5 | Kronos 2190 | 17.7 | 17.7 | 17.7 | 17.7 | 17.7 | 17.7 |
| 6 | Calcilit Super G | 7.5 | 7.5 | 7.5 | 7.5 | 7.5 | 7.5 |
| 7 | Alberdingk AC 2403 | 57.9 | 57.9 | 57.9 | 57.9 | 57.9 | 57.9 |
| 8 | Demin. Water | 5.8 | 4.8 | 5.3 | 4.5 | 4.8 | 4.5 |
| 9 | BYK-349 | 0.1 | 0.1 | 0.1 | 0.1 | 0.1 | 0.1 |
| 10 | AMP 90 | 0.2 | 0.2 | 0.2 | 0.2 | 0.2 | 0.2 |
| 11 | Texanol | 2.2 | 2.2 | 2.2 | 2.2 | 2.2 | 2.2 |
| 12 | Nalzin FA 179 | 0.5 | 0.5 | 0.5 | 0.5 | 0.5 | 0.5 |
| 13 | OPTIFLO-T 1000 | 0.5 | 0.5 | 0.5 | 0.5 | 0.5 | 0.5 |
| 14 | BYK-024 | 0.3 | 0.3 | 0.3 | 0.3 | 0.3 | 0.3 |
| | | 100.0 | 100.0 | 100.0 | 100.0 | 100.0 | 100.0 |

Therefore, components 5 and 6 were placed together in an 80 ml PE-cup and component 7 in a 175 ml PE-cup and put aside. In another 80 ml PE-cup, component 1-4 were added in the same order as in the table above and homogenized by using a Dispermat CV (Getzmann GmbH) with a Teflon disk, Ø 2.0 cm, for 2 minutes at 4 m/s.

Then, component 5 and 6 were added to that preparation under stirring and dispersed for 10 minutes at 10 m/s. After finishing this preparation, so called slurry, it was put aside and the 175 ml PE cup, with component 7 in it, was placed under the Dispermat CV. The slurry was then added to component 7 under stirring at 4 m/s.

In a final step, component 8-14 were added under stirring one after the other and then dispersed for 3 minutes at 4 m/s.

The samples were stored for 24 h.

2.2. Application

After 24 hours storage, all samples were homogenized by stirring with a spatula and then applied onto cold rolled steel (Gardobond OC panels, Chemetall) by using a 200 μm wire bar coater. Each sample was applied onto 3 panels. After application, the panels were stored for 7 days at room temperature.

2.3. Neutral Salt Spray Test (NSS) According to ISO 9227

Neutral salt spray test was carried out according to DIN EN ISO 9227 after drying for 7 days at room temperature.

Before putting the panels into the salt spray tester (VLM), a scribe mark was applied in the middle of the coating of each panel (50 mm long, 1 mm wide) by using a scribing tool according to DIN EN ISO 17872, Annex A (e.g. Sikkens). Furthermore, the non-coated areas of the panels, reverse sides and edges, were protected against corrosion with an adhesive tape. After preparing the panels, they were exposed in the salt spray tester for 20 days.

After 20 days, the panels were removed, dried by paper and immediately evaluated. The loose or delaminated coating was removed along the scribe mark with a special knife (scraper). The scraper was held with its force perpendicular to the panel surface and parallel to the scribe, moving it back and forth across the scribe to remove the coating that suffered loss of adhesion. The coating that still has adhesion was not removed.

The following formula was used to measure the width of delamination:

$$Wd(mm) = \frac{\text{Average of delamination measured on 6 } \textit{diff} \cdot \text{points} - 1}{2}$$

2.4. Results

| Neutral salt spray test (DIN EN ISO 9227)-480h | Panel | Delamination [mm] |
|---|---|---|
| Control | 1 | 10 |
|  | 2 | 13 |
|  | 3 | 10 |
| P1* | 1 | 14 |
|  | 2 | 15 |
|  | 3 | 12 |
| P2* | 1 | 5 |
|  | 2 | 8 |
|  | 3 | 8 |
| P3 | 1 | 2 |
|  | 2 | 5 |
|  | 3 | 5 |
| P5 | 1 | 8 |
|  | 2 | 3 |
|  | 3 | 6 |
| P6 | 1 | 7 |
|  | 2 | 7 |
|  | 3 | 3 |

The results of the salt spray test show that with the wetting- and dispersing additives P3, P5 and P6 less delamination than without any wetting- and dispersing additive (Control) or with the not inventive wetting- and dispersing additives P1* and P2* was achieved.

Less delamination means a better adhesion of the coating on the substrate, which correlates to an improvement of corrosion resistance.

The invention claimed is:

1. An aqueous composition comprising:
a continuous aqueous phase,
a polymer comprising a polymer backbone including carboxylic acid groups covalently linked to the polymer backbone, dissolved in the continuous aqueous phase, wherein 10 to 100 mol-% of the carboxylic acid groups are neutralized by a base including one or more of ammonia, an amine having 1 to 12 carbon atoms, and mixtures thereof,
a polyalkylene oxide terminated at one end by an aliphatic hydrocarbyl group having 8 to 30 carbon atoms, and
a compound according to formula (I)

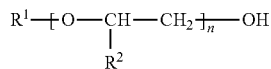

wherein $R^1$ is an aliphatic or aromatic hydrocarbon with 3 to 10 carbon atoms, $R^2$ is H or $CH_3$ and n is 1 or 2,
wherein the polymer, the polyalkylene oxide, and the compound according to formula (I) together have an acid value in the range of 20 to 200 mg KOH/g,
and wherein the polymer has one or more pendant groups (A) connected to the polymer backbone by a covalent link, wherein a pendant group of the one or more pendant groups (A) comprises a polyalkylene oxide segment and a hydrocarbyl segment having 8 to 30 carbon atoms, and wherein the polyalkylene oxide segment is located between the hydrocarbyl segment and the covalent link.

2. The composition according to claim 1, wherein the polymer has one or more pendant groups (B) connected to the polymer backbone by a covalent link, wherein a pendant group of the one or more pendant groups (B) comprises one aromatic or aliphatic group and 1 or 2 non-cyclic ether groups, and wherein the 1 or 2 non-cyclic ether groups are located between the aromatic or aliphatic group and the covalent link.

3. The composition according to claim 1, wherein the polymer comprises repeating units of polymerized ethylenically unsaturated monomers.

4. The composition according to claim 3, wherein the ethylenically unsaturated monomers comprise one or more of vinyl aromatic monomers, carboxylic acid-functional monomers, and carboxylic anhydride-functional monomers.

5. The composition according to claim 3, wherein the ethylenically unsaturated monomers include one or more of a combination of styrene and maleic anhydride, a combination of alpha-methylstyrene and maleic anhydride, and a combination of alpha-methyl styrene, styrene, and maleic anhydride.

6. The composition according to claim 1, wherein the base includes one or more of ammonia and an amine that has a boiling point of at most 100° C. at a pressure of 1000 mbar.

7. An aqueous coating composition comprising
i) water,
ii) a film-forming binder, and
iii) the composition according to claim 1.

8. The aqueous coating composition according to claim 7, wherein the composition further comprises solid particles.

9. The aqueous coating composition according to claim 8, wherein the solid particles are selected from pigments and fillers.

10. A process for preparing an aqueous composition comprising a continuous aqueous phase, the process comprising:
providing a copolymer comprising cyclic carboxylic anhydride groups,
in the absence of water, reacting the cyclic carboxylic anhydride groups of the copolymer with a polyalkylene oxide and a compound and generating carboxylic acid groups, wherein the polyalkylene oxide is terminated at one end by an aliphatic hydrocarbyl group having 8 to 30 carbon atoms, and the compound is of the following formula (I):

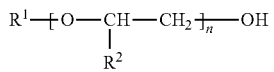

wherein $R^1$ is an aliphatic or aromatic hydrocarbon with 3 to 10 carbon atoms, $R^2$ is H or $CH_3$ and n is 1 or 2,
wherein the copolymer comprising the carboxylic acid groups, the polyalkylene oxide, and the compound together have an acid value in the range of 20 to 200 mg KOH/g,
neutralizing 10 to 100 mol-% of the carboxylic acid groups of the copolymer by adding a base including one or more of ammonia, an amine having 1 to 12 carbon atoms, and mixtures thereof,
diluting the mixture of the copolymer, the polyalkylene oxide, and the compound with water.

11. The process according to claim 10, said carboxylic acid groups being neutralized with an aqueous solution of said base.

12. A process of dispersing solid particles in an aqueous composition comprising combining the aqueous composition of claim 1 with solid particles.

* * * * *